(12) United States Patent
Yeh

(10) Patent No.: US 7,793,549 B1
(45) Date of Patent: Sep. 14, 2010

(54) PRESSURE GAUGE LOCKING STRUCTURE OF PAINTBALL GUN

(76) Inventor: Chien-Chih Yeh, No. 61, Lane 15, Xianbei St., North Dist., Tainan City (TW)

( * ) Notice: Subject to any disclaimer, the term of this patent is extended or adjusted under 35 U.S.C. 154(b) by 0 days.

(21) Appl. No.: 12/250,693

(22) Filed: Oct. 14, 2008

(51) Int. Cl.
*G01L 7/00* (2006.01)
*B05B 9/01* (2006.01)

(52) U.S. Cl. .......................................... 73/714; 239/526
(58) Field of Classification Search .................. None
See application file for complete search history.

(56) References Cited

U.S. PATENT DOCUMENTS

| | | | | |
|---|---|---|---|---|
| 4,085,611 | A * | 4/1978 | Schwartz | 73/114.18 |
| 5,191,797 | A * | 3/1993 | Smith | 73/714 |
| 6,585,173 | B2 * | 7/2003 | Schmon et al. | 239/526 |
| 6,898,979 | B2 * | 5/2005 | Cowan et al. | 73/732 |
| 7,017,838 | B2 * | 3/2006 | Schmon | 239/526 |
| 7,181,953 | B1 * | 2/2007 | Street | 73/29.05 |
| 7,216,813 | B2 * | 5/2007 | Rogers | 239/74 |
| 7,249,519 | B2 * | 7/2007 | Rogers | 73/754 |
| 7,384,004 | B2 * | 6/2008 | Rogers | 239/74 |
| 7,422,164 | B2 * | 9/2008 | Matsumoto | 239/526 |
| 7,509,864 | B2 * | 3/2009 | Charpie | 73/714 |

* cited by examiner

*Primary Examiner*—Andre J Allen
*Assistant Examiner*—Jermaine Jenkins
(74) *Attorney, Agent, or Firm*—WPAT, P.C.; Anthony King

(57) ABSTRACT

A pressure gauge locking structure of a paintball gun includes a rear cap and a pressure gauge. The rear cap is screwed to a rear end of a gun body and has a first end and a second end. The first end is formed with a recess for the pressure gauge to be secured therein. The second end is provided with a piston block which has a stepped hole therein. The stepped hole is disposed axially and interconnected with the recess. The pressure gauge has a guiding rod which has a threaded hole for insertion of a screw member. The pressure gauge has an air passage for interconnecting with an air passage of the piston block so that the pressure gauge is unable to be dismantled from its exterior and the user reads the pressure gauge easily.

2 Claims, 5 Drawing Sheets

A

PRESSURE GAUGE LOCKING STRUCTURE OF PAINTBALL GUN

BACKGROUND OF THE INVENTION

1. Field of the Invention

The present invention relates to a pressure gauge locking structure of a paintball gun, and more particularly to a pressure gauge that is secured to a rear cap with a screw member in an opposite direction. The rear cap is screwed to a rear end of a gun body to facilitate reading of the pressure gauge.

2. Description of the Prior Art

A conventional paintball gun is provided with a pressure gauge coupled to a gun handle or a gun body, which also requires using glue for air seal.

However, the position of the pressure gauge may influence the user with griping the handle of the gun, and it is not easy to dismantle the pressure gauge quickly.

In order to solve this problem, an invention was issued with a Patent No. M338978 by the ROC PTO office, in the title of "Pressure Measurement Device for a Paintball Gun", as shown in FIG. 5, which comprises a pressure gauge B having a guiding rod B1 extending outwardly corresponding to a stepped recess A1 of a rear cap A, and then covered with a canopy C by threading with a second threaded section A2. The rear cap A is then secured to a rear end of a gun body D, with a firing barrel E engaging with the rear cap A. A front end of the pressure gauge B is formed with a trough B2 with a cap B3 secured therein. The pressure gauge B is located behind the firing barrel E in the gun body D so that the user may detect the pressure when holding the gun body D.

Although the prior art has solved the previous shortcomings, however, it still has some defects, such as:

1. The canopy may block the user's vision, in some occasion;
2. The canopy requires more fasteners to be secured.
3. The pressure gauge may be dropped, loosened or damaged when dismantling the canopy.

SUMMARY OF THE INVENTION

The present invention provides a pressure gauge locking structure for a paintball gun to secure the pressure gauge from inside of the gun body to avoid dismantling the pressure gauge from outward, and eliminates d the canopy so that the user may spot the view without any obstacle.

According to the present invention, there is provided a pressure gauge locking structure of a paintball gun, comprising a rear cap and a pressure gauge, said rear cap being screwed to a rear end of a gun body:

said rear cap having a first end and a second end, said first end being formed with a recess, said second end being provided with a piston block, said piston block having a stepped hole at a central portion thereof, said stepped hole being disposed axially and interconnected with said recess, said piston block comprising a first air sealing ring thereon, said rear cap comprising a second air sealing ring thereon, said rear cap having a first air passage formed between said first air sealing ring and said second air sealing ring; said pressure gauge disposed in said recess of said rear cap comprising a guiding rod, said guiding rod having a threaded hole therein for insertion of a screw member, said guiding rod comprising two air sealing rings thereon and a second air passage formed between said two air sealing rings, said second air passage interconnecting with said first air passage.

Preferably, said rear cap is provided with a buffering ring.

Preferably, said gun body comprises a firing barrel therein, said rear cap being secured to a rear end of the gun body, said firing barrel holding against said buffering ring of said rear cap.

Preferably, a rear end of the said firing barrel is formed with a third air passage for interconnecting with said first air passage.

Preferably, an air chamber is formed between said gun body and said firing barrel, said third air passage interconnecting with said air chamber.

It is the primary object of the present invention to provide a pressure gauge locking structure of a paintball gun, which has eliminated the canopy so that it has a better vision to the object and to read the pressure from the gauge.

It is another object of the present invention to provide a pressure gauge locking structure of a paintball gun, which has the pressure gauge secured to the gun body directly to eliminate unnecessary parts so as to decrease the cost.

It is a further object of the present invention to provide a pressure gauge locking structure of a paintball gun, which has the pressure gauge locked to the rear cap as one part of the present invention to save manufacturing time and to facilitate exchanging broken parts.

It is still a further object of the present invention to provide a pressure gauge locking structure of a paintball gun, which has the pressure gauge secured to the gun body from inside so as to prevent illegal destroy.

It is still a further object of the present invention to provide a pressure gauge locking structure of a paintball gun, which has the pressure gauge secured to the gun body at the right position.

DETAILED DESCRIPTION OF THE PREFERRED EMBODIMENT

Figure 1:
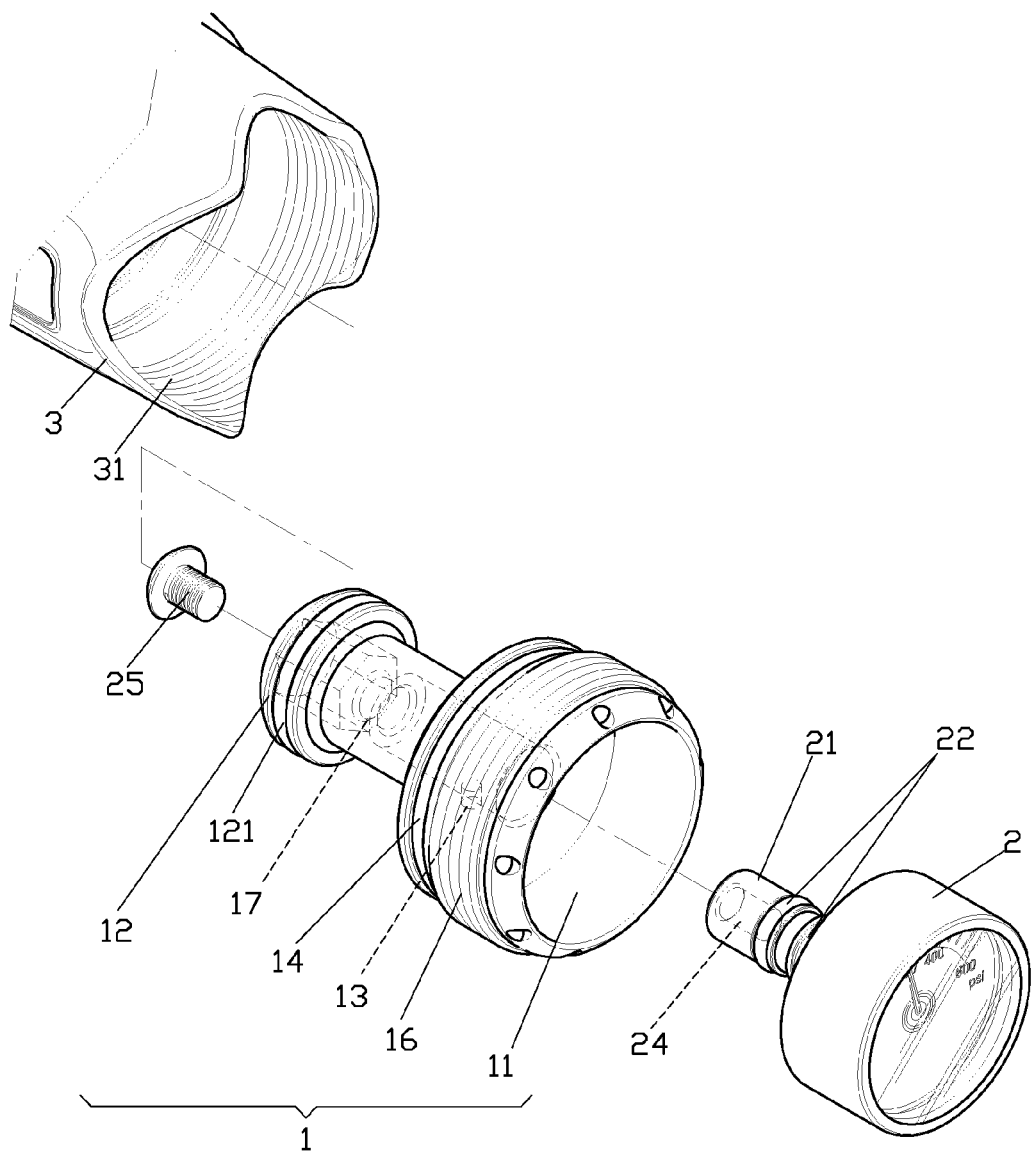
FIG. 1 is an exploded view of the present invention.
Figure 2:
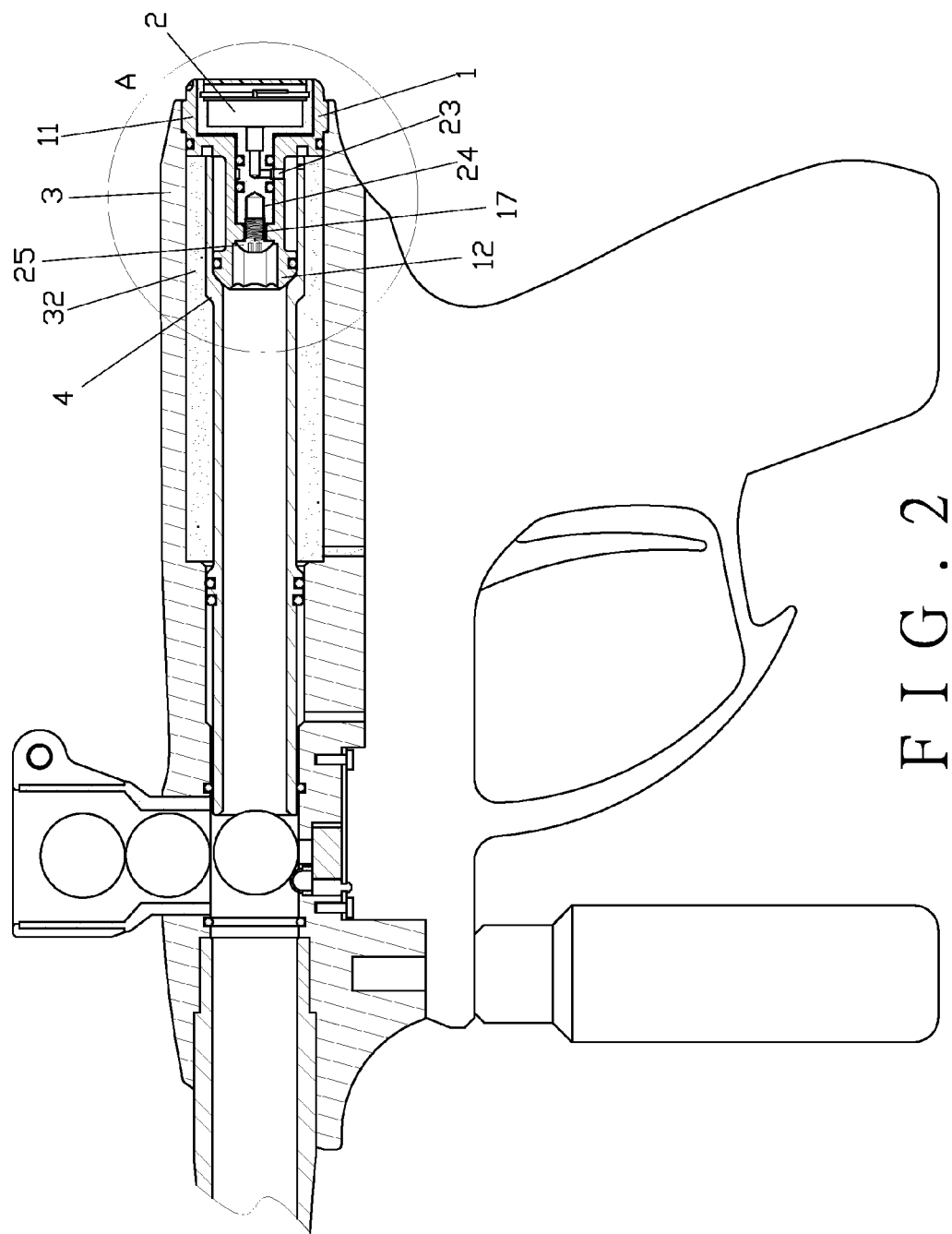
FIG. 2 is a cross-sectional view of the present invention.
Figure 3:
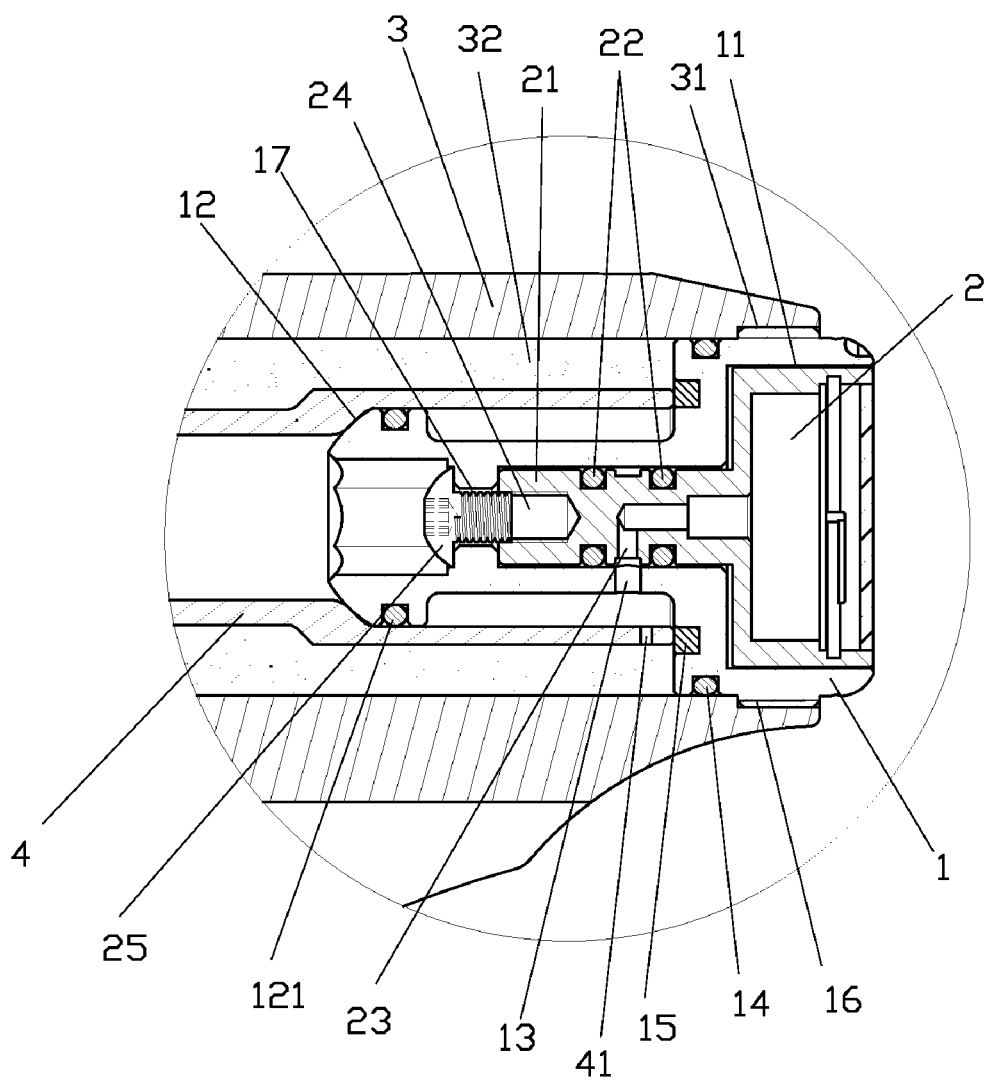
FIG. 3 is an enlarged view taken along circle A of FIG. 2.

A pressure gauge locking structure of a paintball gun according to a preferred embodiment of the present invention, as shown in FIGS. 1, 2 and 3, comprises a rear cap 1 and a pressure gauge 2. The rear cap 1 is screwed to a rear end of a gun body 3. The gun body 3 comprises a firing barrel 4 therein.

The rear cap 1 has a first end and a second end. The first end is formed with a recess 11 for accommodating the pressure gauge 2. The second end is provided with a piston block 12 which has a stepped hole 17 at a central portion thereof. The stepped hole 17 is disposed axially and interconnected with the recess 11. The piston block 12 further comprises a first air sealing ring 121 thereon. The rear cap 1 comprises a second air sealing ring 14 thereon. The rear cap 1 is formed with a first air passage 13 between the first air sealing ring 121 and the second air sealing ring 14, as shown in FIG. 3. The rear cap 1 further comprises a buffering ring 15 corresponding to the firing barrel 4 to buffer the recoil force from the firing barrel 4. The rear cap 1 further comprises a first threaded section 16 thereon for connecting with the gun body 3.

The pressure gauge 2 comprises a guiding rod 21 at one end thereof. The guiding rod 21 has a threaded hole 24 therein for insertion of a screw member 25. The guiding rod 21 further comprises two sealing rings 22 thereon. The guiding rod 21 is formed with a second air passage 23 between the two sealing rings 22.

The gun body 3 has a second threaded section 31 at a rear end for connecting with the rear cap 1. The firing barrel 4 is disposed in the gun body 3 and holds against the rear cap 1. An air chamber 32 is formed between the gun body 3 and the firing barrel 4.

The firing barrel 4 is formed with a third air passage 41 at a rear end thereof. The third air passage 41 is interconnected to the first air passage 13 of the rear cap 1.

Figure 4:
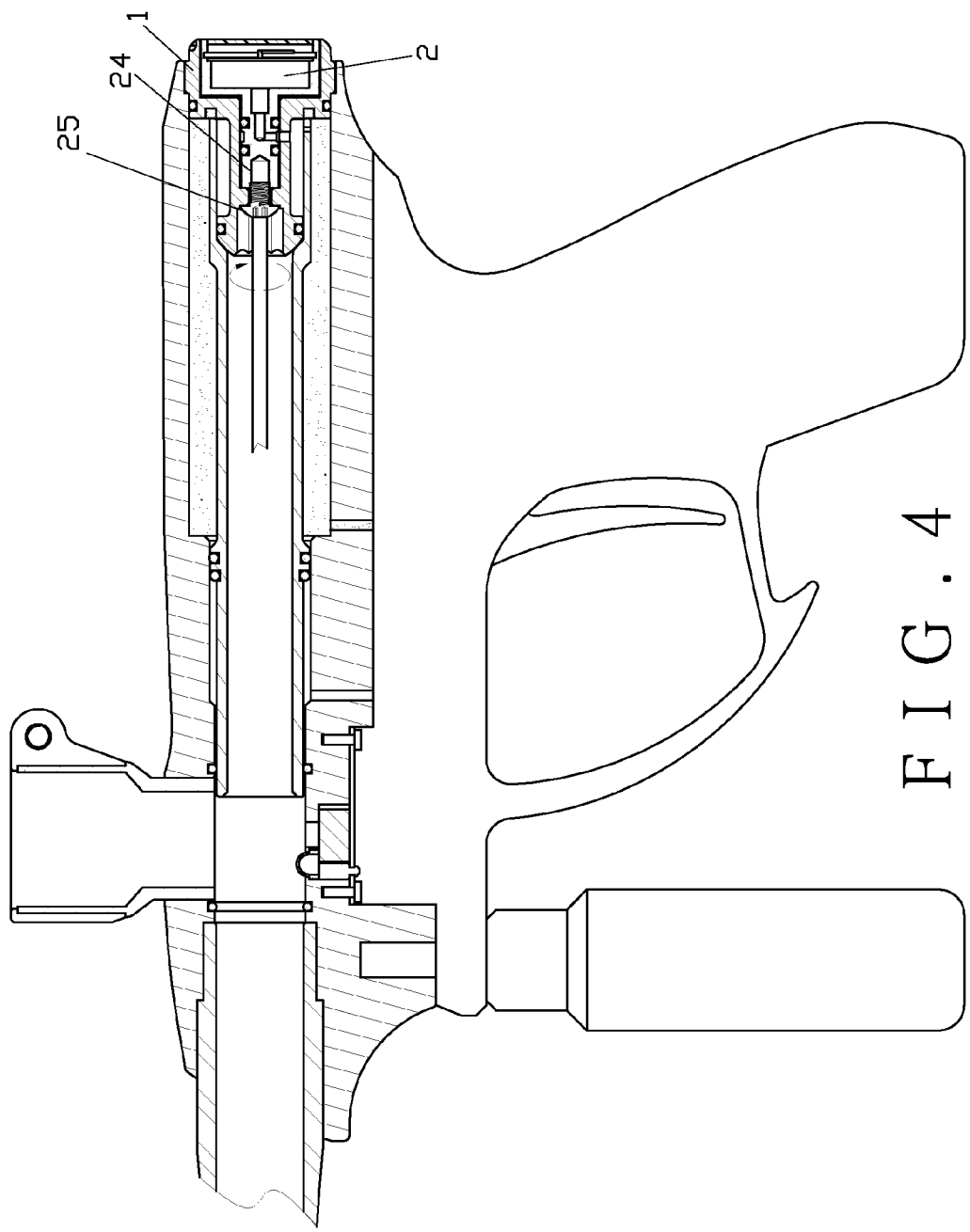
FIG. 4 is a cross-sectional view of the present invention showing that a pressure gauge is secured.
Figure 5:
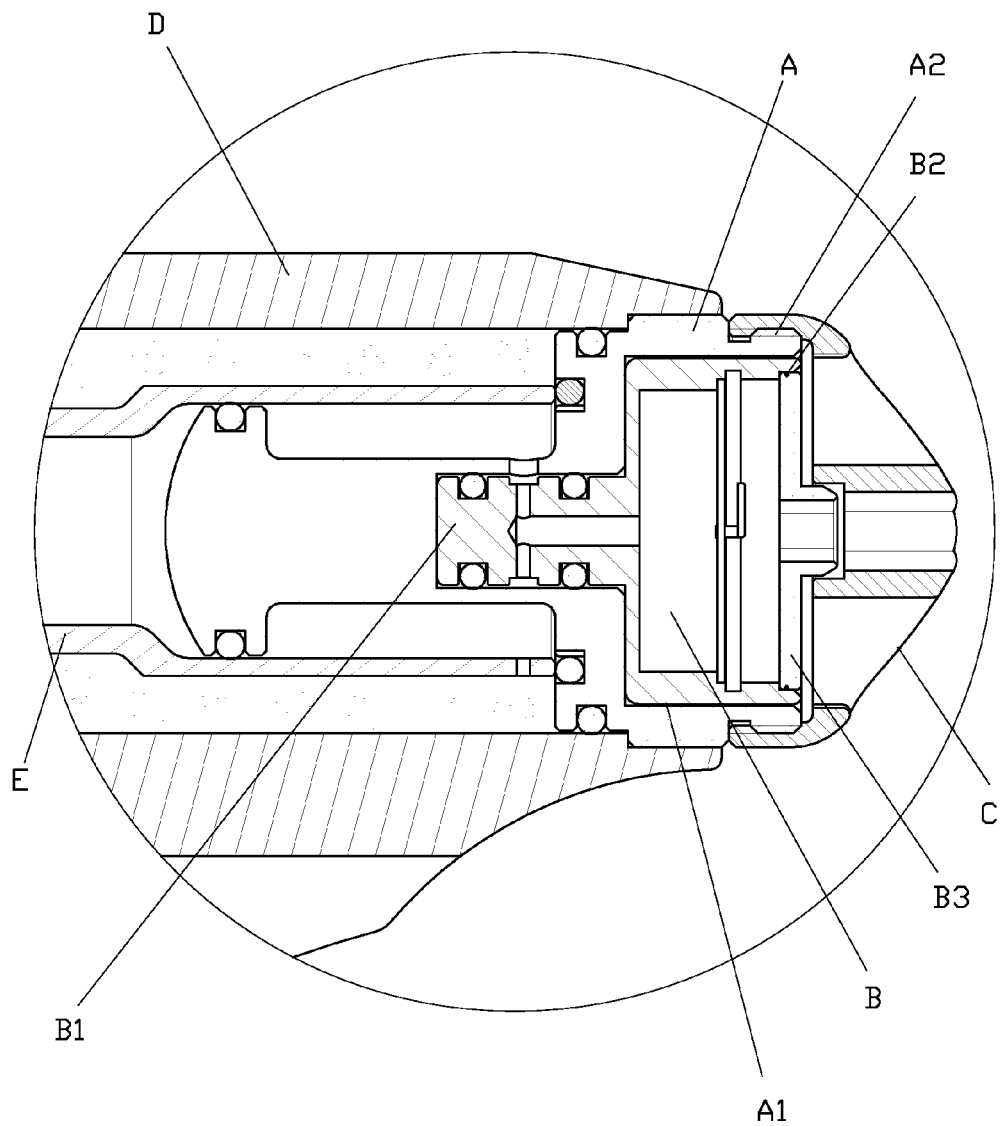
FIG. 5 is an enlarged sectional view of the prior art.

To assemble the present invention, as shown in FIGS. 1 and 3, the rear cap 1 is screwed to the threaded section 31 of the gun body 3. The guiding rod 21 of the pressure gauge 2 is inserted into the recess 11 of the rear cap 1, with the threaded hole 24 in the guiding rod 21 corresponding to the stepped hole 17 of the piston block 12. The screw member 25 is screwed to the threaded hole 24 of the guiding rod 21 with a tool extending into the firing barrel 4 to secure the pressure gauge 2, as shown in FIG. 4. The pressure gauge 2 can be adjusted before it is secured. The firing barrel 4 in the gun body 3 holds against the rear cap 1 so that the second air passage 23 of the pressure gauge 2, the first air passage 13 of the rear cap 1, the third air passage 41 of the firing barrel 4, and the air chamber 32 between the gun body 3 and the firing barrel 4 are interconnected, allowing the pressure in the gun body 3 to be shown by the pressure gauge 2.

The installation of the present invention may be done by aligning the pressure gauge 2 with the recess 11 of the rear cap 1, and then the screw member 25 is screwed to the threaded hole 24 of the guiding rod 21. The pressure gauge 2 is locked to the rear cap 1 directly as a semi-finished good. This facilitates the assembly of the parts and is easy to replace when any parts are damaged.

What is claimed is:

1. A pressure gauge locking structure of a paintball gun, comprising a rear cap and a pressure gauge, said rear cap being screwed to a rear end of a gun body:

said rear cap having a first end and a second end, said first end being formed with a recess, said second end being provided with a piston block, said piston block having a stepped hole at a central portion thereof, said stepped hole being disposed axially and interconnected with said recess, said piston block comprising a first air sealing ring thereon, said rear cap comprising a second air sealing ring thereon, said rear cap having a first air passage formed between said first air sealing ring and said second air sealing ring;

said pressure gauge disposed in said recess of said rear cap comprising a guiding rod, said guiding rod having a threaded hole therein for insertion of a screw member, said guiding rod comprising two air sealing rings thereon and a second air passage formed between said two air sealing rings, said second air passage interconnecting with said first air passage.

2. The pressure gauge locking structure of a paintball gun, as recited in claim 1, wherein said rear cap is provided with a buffering ring.

* * * * *